United States Patent [19]

Newell

[11] 4,441,176
[45] Apr. 3, 1984

[54] DAMPING MECHANISM FOR A VIDEO DISC STYLUS HOLDER

[75] Inventor: Stephen T. Newell, Danville, Ind.

[73] Assignee: RCA Corporation, New York, N.Y.

[21] Appl. No.: 366,643

[22] Filed: Apr. 8, 1982

[51] Int. Cl.³ .............................................. G11B 3/50
[52] U.S. Cl. .................................. 369/170; 369/126; 369/247
[58] Field of Search ............... 369/170, 171, 172, 173, 369/246, 247, 126

[56] References Cited

U.S. PATENT DOCUMENTS

| | | | |
|---|---|---|---|
| 3,444,335 | 5/1969 | Walton | 179/100.41 |
| 4,063,285 | 12/1977 | Nagaoka | 369/247 |
| 4,113,265 | 9/1978 | Iyeta | 369/247 |
| 4,124,217 | 11/1978 | Tajima | 274/37 |

FOREIGN PATENT DOCUMENTS

| | | |
|---|---|---|
| 56-25209 | 11/1981 | Japan ............................ 369/247 |
| 58-153243 | 9/1983 | Japan . |
| 579738 | 7/1941 | United Kingdom . |
| 615979 | 1/1944 | United Kingdom . |
| 632675 | 1/1947 | United Kingdom . |
| 693161 | 2/1948 | United Kingdom . |
| 799329 | 7/1954 | United Kingdom . |
| 979856 | 2/1961 | United Kingdom . |
| 1469483 | 4/1974 | United Kingdom . |
| 1512842 | 5/1975 | United Kingdom . |

OTHER PUBLICATIONS

C. f. Hackett, B. K. Taylor, "The Video Disc Groove--Riding Stylus Cartridge", RCA Engineer, Nov./Dec. 1981, pp. 26–29, Cherry Hill, NJ.

*Primary Examiner*—Steven L. Stephan
*Attorney, Agent, or Firm*—E. M. Whitacre; J. S. Tripoli; E. P. Herrmann

[57] ABSTRACT

Video disc stylus holders are designed to provide vertical decoupling of the pickup stylus from the stylus support arm. The compliance designed into the holder gives rise to mechanical resonant modes which affect the recovered signal in the audio range. A rigid damping element secured to the compliant section of the stylus holder by a lossy adhesive or a lossy mass rigidly secured to the compliant section of the stylus holder reduces the amplitude of the resonant modes.

13 Claims, 6 Drawing Figures

DAMPING MECHANISM FOR A VIDEO DISC STYLUS HOLDER

This invention relates generally to video disc record playback apparatus and more particularly to signal pickup transducer (stylus) holders for capacitive disc type systems.

In the capacitive disc systems the recorded signal is recovered from the disc by a stylus tracking recorded information tracks on the surface of the disc. The stylus is secured to one end of a relatively long stylus arm, the other end of which is compliantly secured to a carriage mechanism. The carriage mechanism translates the stylus-stylus arm assembly radially across the disc at a speed in consonance with the radial movement associated with the stylus following the information track.

The stylus arm is arranged so that it is substantially tangent to the information track from which signal is currently being recovered. An armstretcher transducer is coupled to the end of the stylus arm and secured to the carriage for the purpose of creating longitudinal motion in the stylus arm. This motion is used to maintain stylus-disc relative velocity in a direction along the track being traced. In addition a further transducer is coupled to the stylus arm for selectively producing lateral or side-to-side translations of the stylus.

In order to facilitate incorporation of these features in the player the stylus arm must be relatively long and relatively rigid or stiff. However, in order for the stylus to track over vertical disc imperfections (i.e., normal to the disc surface) other than simple disc warp without being lofted from the disc, requires that the stylus be secured to the stylus arm by a means which affords a degree of vertical decoupling. Thus it has been found to be advantageous to mount the stylus in a resilient holder, e.g., plastic, which in turn is fixed to the stylus arm. These holders have a longitudinal section generally colinear with the long axis of the stylus arm and yield vertically to permit the stylus to ride over bumps on the disc independent of the vertical inertia of the stylus arm itself. See for example U.S. Pat. No. 4,030,124.

These stylus holders provide very satisfactory performance in disc players which produce monaural signal for reproduction in monoraul television receivers where the audio bandwidth is typically below 7 KHz. It was discovered, however, that when wide band stereo signals are reproduced from a disc record an erratic tone is present in the recovered signal located in the audio band at about 10 KHz and which is manifested as a hissing sound. This tone is produced by a mechanical resonance of the stylus holder which tends to cause an AM modulation of the recovered carrier as well as a phase modulation of the recovered carrier. When the recovered audio carrier is demodulated both AM and phase modulated components contributed by the stylus holder resonance appear in the base band audio at the same frequency. Attempts to stiffen the stylus holder and thereby to push the resonant frequency beyond the audio bandwidth proved to be unsuccessful.

SUMMARY OF THE INVENTION

The present invention is a stylus holder which is improved by the addition of a damping element to substantially eliminate the effects of mechanical resonances in the audio frequency spectrum. The stylus holder comprises a generally resilient member having a first end configured for receiving and holding a signal pickup stylus, having a second end configured for rigid attachment to the end of a longitudinal stylus arm and a generally longitudinal center section between the ends. A small mass, e.g., 1-10 milligrams, is located approximately midway between the ends of the center section and secured thereto by a mechanically lossy adhesive. Rather than simply lowering the resonant frequency the added mass coupled via the lossy adhesive tends to absorb the energy at resonance and diminishes its effect on the signal recovery system.

Alternatively a generally mechanically lossy material (mass) may be secured to the stylus holder by e.g., a non-lossy adhesive to achieve substantially the same effect.

DETAILED DESCRIPTION OF THE INVENTION

Figure 1A:
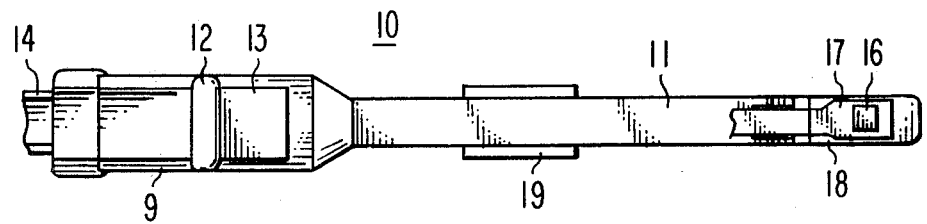
FIGS. 1A and B, 2A and B and 3A and B are top and side views of three embodiments of a stylus holder equipped with a mass for absorbing mechanical energy at the resonant frequency of the holder.

In the drawings elements designated with like numbers are the same or similar items in the various figures.

Figure 1B:
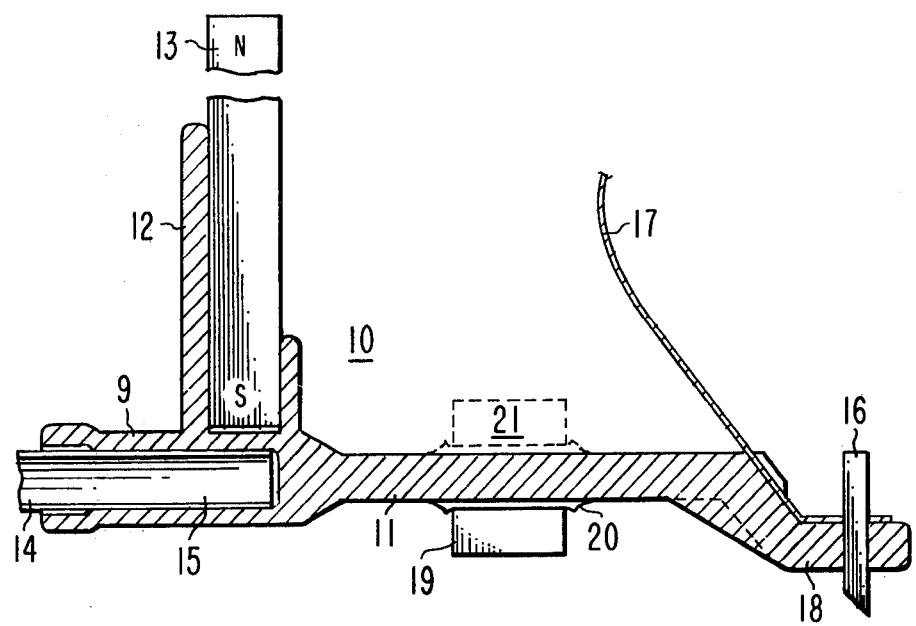

FIG. 1A is a top view of one particular embodiment of a stylus holder 10 in which resonant modes occurring at audio frequencies are reduced and FIG. 1B is a cross-section of a side view of the same holder. The holder 10 includes a first section 18 at one end for receiving and holding a signal pickup stylus 16 and for securing one end of a leaf spring 17 which provides stylus-disc engaging pressure when the stylus is in its operative position.

Section 18 is connected to a longitudinal center section 11 which is defined generally as being that portion of the central beam which has a uniform cross-section. The center section 11 provides some compliance between the ends of the holder 10 to permit limited movement of the stylus independent from the opposite end of the holder. The compliance enables the stylus to ride over disc imperfections free from the average inertia of the total pickup apparatus, i.e., the inertia of the stylus-stylus arm combination.

The center section 11 of the stylus holder 10 is connected to a second end section 9 which has a recess 15 therein for receiving the end of a supporting stylus arm 14. The stylus holder 10 is secured to the stylus arm 14 either by compressive force developed between the holder and the stylus arm, for example, where the inner dimension of the recess is designed smaller than the outer dimension of the stylus arm or it may be held in place by an adhesive. An alternative configuration is to design the second end 9 of the stylus holder 10 to be received into a recess in the end of the stylus arm. Typically the end sections and center section will be integrally molded from a plastic material.

The stylus holder includes an extension 12 for the purpose of supporting a permanent magnet 13 having a polar axis perpendicular to the long axis of the center section 11. The extension 12 also serves as a stop which cooperates with further elements not shown to limit the instantaneous side-to-side travel of the stylus-stylus arm combination. The magnet 13 cooperates with electromagnetic coils (not shown) which are mounted in the player to selectively generate forces on the stylus holder for translating the stylus in a direction into and out of the drawing (with reference to FIG. 1B).

The center section 11 is dimensioned to afford sufficient vertical compliance or decoupling of the stylus 16 from the stylus arm 14, that the stylus will reliably track the disc record. (The vertical direction as referred to herein is the direction perpendicular to the surface of the disc record, which direction is generally parallel with the long axis of the stylus 16 as shown in the Figures) Typically, however, when this criteria is met the stylus holder will exhibit mechanical resonance which is excited by disc imperfections and which are located in the audio frequency spectrum, e.g., in the range of 7-11 KHz. It is believed that the resonant mode causes the center section 11 of the holder to flex about an axis normal to the plane defined by the intersection of sections 11 and 12. The flexing is cyclically correlated and modulates the pressure at which the stylus engages the disc, thereby tending to amplitude modulate the recovered signal. In addition, the flexing creates an oscillatory relative stylus-disc velocity component which phase modulates the recovered signal. Ultimately the amplitude and phase modulated signal components due to the mechanical resonant modes of the stylus holder are manifested as a hiss in the audio output of the receiver.

A mass 19 is secured to the center section 11 approximately at its midpoint to reduce the effect of the mechanical resonance. Ideally the mass should be located at the point on the center section corresponding to the antinodal point, i.e., the points of maximum deflection.

For a stylus holder with a center section having a uniform cross section the antinodal point will typically be located midway between the ends of such section. On the other hand if the center section is tapered toward one end the antinodal point will be nearer the smaller end.

The mass 19 is a relatively rigid material and must be attached to the stylus holder 10 by a lossy adhesive, e.g., silicone grease such as "High Vacuum Grease", manufactured by Dow Corning Corp., Midland, Mich. Note that if the rigid mass is rigidly secured to the stylus holder it will affect the dynamics of the holder by raising or lowering the frequency of the resonant modes and not their amplitude response. Experimentally it was found that rigidly securing a rigid mass to the center section of the stylus holder tended to lower the resonant frequency to a more objectionable frequency band without significantly lowering its amplitude response. However, the use of a lossy adhesive to secure the rigid mass 19 to the center section 11 does produce a reduction in the amplitude response at resonance. This phenomenon is believed to result from the fact that the added mass 19 does not intimately follow the motion of the stylus holder, i.e., the inertia of the added mass tends to maintain the mass in some average position. The lossy adhesive 20 may be considered to couple the added mass to the center section 11 by predominantly frictional (viscosity) forces which generate heat in the adhesive as the resonant motion of the midpoint of the center section moves away from and toward the average position of the mass 19 thereby damping (reducing) the motion of the stylus holder. Tests on a currently available stylus holder for a commercial video disc player have shown that the resonant peak amplitude can be reduced by 15 dB by a judicious choice of adhesive and mass size. The 14 dB reduction renders the effect of the resonant mode substantially unnoticeable.

In FIG. 1 the added mass 19 is shown secured by lossy adhesive 20 to the underside of the center section 11. Alternatively the mass can be applied to the upper side of section 11 and is shown as the phantom element 21 in the figure. There are various other possible arrangements and placements such as a "U" shaped mass draped over the holder near the midpoint of section 11.

Lossy adhesives for securing a damping mass to the stylus holder, though they significantly enhance player audio performance are generally not dynamically stable substances. Over time they tend to migrate or crawl or dry out or harden, and these changes can ultimately alter the resonant characteristics of the stylus holder. In anticipation of future problems with lossy adhesives, the present inventor pursued the problem further by considering the use of a mechanically lossy mass secured to the stylus holder. As used hereinafter a mechanically lossy mass is a non rigid body capable of dissipating energy in being deformed. It will generally store and release energy during deformation but the ratio of dissipated to stored energy will be high, generally 0.5 or greater.

A mechanically lossy mass attached to the holder may be considered as a continuum of separate independent small elemental masses each elastically and frictionally secured to the holder. Each elemental mass will obtain some average vertical inertia and position with respect to the holder. The frictional part of the coupling of each elemental mass to the holder will dissipate energy (as heat) as the holder moves toward or away from the average position of the mass elements, and thereby tend to reduce relative vertical displacement of the holder. It is noted that the vertical displacement referred to above pertains to relative displacement of incremental portions of the holder (particularly the center section) with respect to each other and not to an average vertical displacement of the stylus holder as a unit. In the resonant mode the midpoint of the center section will tend to be moving 180 degrees out of phase with its end points in a standing wave. Limiting the motion (damping) of any part of the resonant member, i.e., the mid point, will damp the movement of the remainder of the member.

Figure 2A:
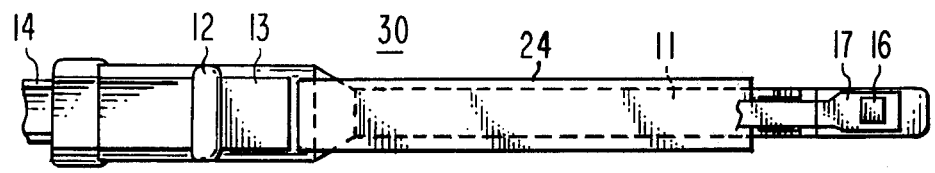
Figure 2B:
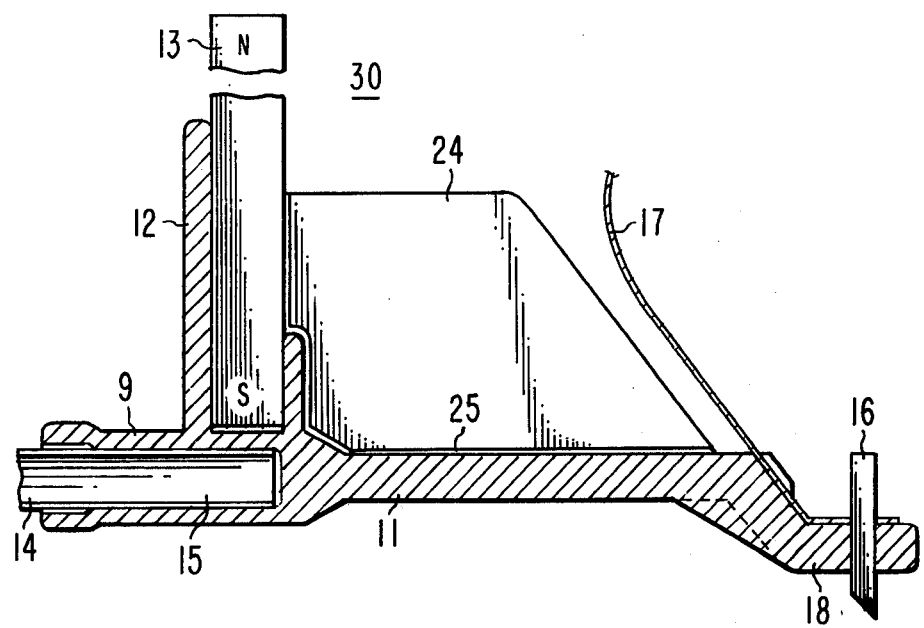

It was found advantageous to secure a mechanically lossy mass over the entire length of the stylus holder center section 11. This embodiment is shown in FIG. 2 wherein a lossy element 24 conformally shaped on two edges to mate with the holder is rigidly cemented (25) to the holder 11. Again if the lossy mass is considered as a continuum of elemental masses secured to the stylus, it should be appreciated that for the case where the lossy mass extends over the entire center section, the elemental masses also interact with each other tending to damp each other's oscillatory motion and thereby effecting further damping of the overall structure.

Experiments with a lossy mass 24 of approximately 3 mg. weight and made from butyl rubber produced an amplitude reduction of 12 dB in the resonant mode. It can be shown by theoretical analysis, however, that a 15 dB reduction in the amplitude response due to resonance should be achievable. It was also found that use of the rubber rudder shaped element had the further beneficial effect of reducing lateral stylus holder resonant modes, i.e., in the direction into or out of the drawing (FIG. 2B), and thereby enhancing the accuracy and reliability of lateral stylus translations (i.e., selective track skipping).

Figure 3A:
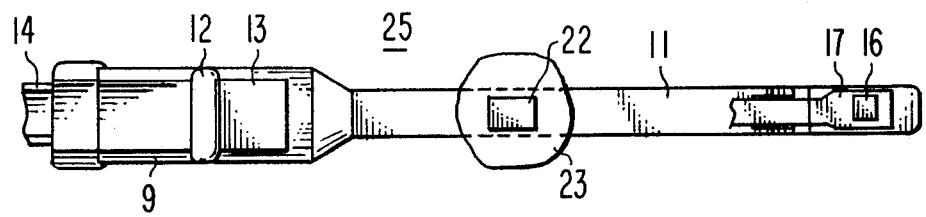
Figure 3B:
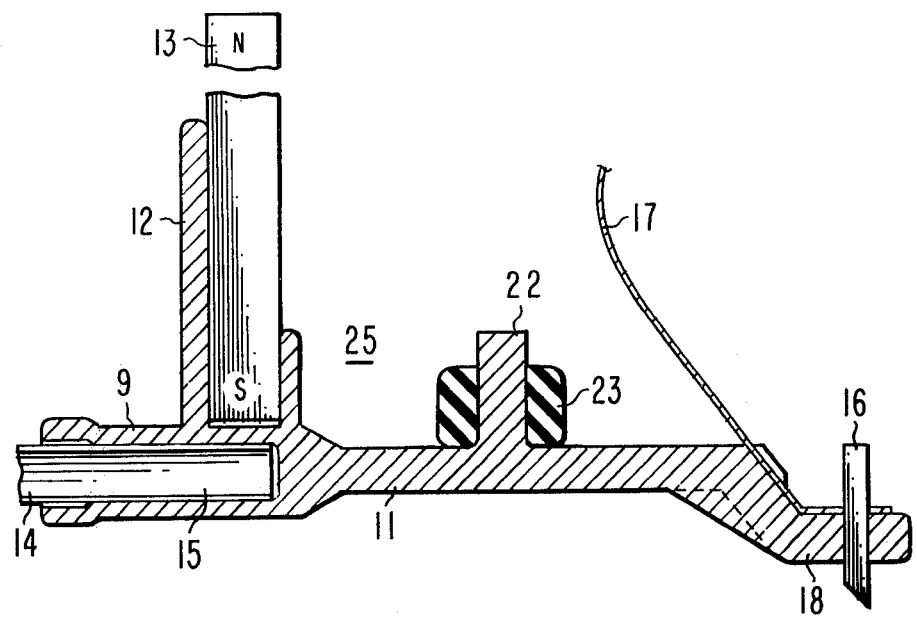

FIG. 3 is a damped stylus holder which evolved from attempts to find a design which is highly manufacturable. The FIG. 3 design employs both a mechanically lossy mass and a lossy material for securing the mass to the holder. Since the mass is a lossy material, changes in the lossy securing material (e.g., adhesive) over time will affect the damping characteristic of the combination to a lesser degree.

The stylus holder 25 in FIG. 3 is molded with a post 22 located approximately at the midpoint of the center section 11. A lossy annular mass 23, e.g., a rubber donut, is circumferentially installed over the post 22 and secured to the post with a silicone rubber (e.g., Dow Corning #Q3-6527 A & B or Dow Corning #734 RTV).

The post 22 serves to position the mass and to hold it in that fixed position. Since the post 22 tends to support the annular mass 23 there is less dependence on the adhesive qualities of the adhesive applied therebetween. As a result the designer has greater latitude in the selection of the adhesive material for damping qualities, rather than e.g., adhesive characteristics. For particular applications the adhesive may be eliminated all together simply by making the dimensions of the donut hole smaller than the dimensions of the post. The donut can then be force fit over the post 22 for self retention. Another alternative consists of a multilayer donut comprised of varying degrees of lossy material, with the layers becoming less lossy toward the outer periphery. The inner lossy layers can be employed to self retain the donut to the post without an adhesive while the outer more rigid layers establish the damping inertia.

The rubber donuts are easily produced by merely cutting sections (0.050″) from a length of rubber tubing (0.045 O.D.×0.019 I.D. silicone rubber, durometer 30–40). In one particular example, a 1.5 mg section of silicone rubber tubing installed on a commercially available video disc stylus holder having a 0.15″×0.020″×0.020″ center section (approximately) will satisfactorily reduce the undesirable resonance characteristics in the audio spectrum.

What is claimed is:

1. In a stylus holder for holding a disc record signal pickup stylus, said holder being of the type having a longitudinal center section separating first and second end sections, said first end section being adapted to receive and secure said pickup stylus, said second end section being adapted for securing the stylus holder to a support arm and said center section exhibiting compliance for limited decoupling of motion of said first end section from the support arm, and wherein said stylus holder has resonant modes at which it is subject to be excited into objectionable mechanical oscillation normal to said longitudinal center section and wherein said center section is mechanically damped to reduce the amplitude of said oscillation, an improved damping apparatus comprising:

an extension perpendicular to the long axis of the center section located between the ends of said center section;

an annular shaped mass circumferentially mounted on said extension, said annular shaped mass being supported by said extension and said longitudinal center section only, to afford vertical compliance to said holder so that said signal pickup stylus reliably tracks said disc record to provide added mass whose inertia tends to maintain said mass in some average position effecting frictional forces which damp said objectionable mechanical oscillation.

2. The stylus holder set forth in claim 1 further including a mechanically lossy material for securing the annular mass to the extension.

3. The stylus holder set forth in claim 1 wherein the annular mass is a mechanically lossy material.

4. The stylus holder set forth in claim 3 wherein the annular mass is a section of silicone rubber tubing.

5. The stylus holder set forth in claim 3 wherein the annular mass is between 1 and 6 milligrams in weight.

6. The stylus holder set forth in claim 1 wherein the annular mass is a lossy material and is secured to the extension by virtue of the dimensions of the central void of the annular mass being smaller than the outer cross sectional dimensions of the extension.

7. The stylus holder set forth in claim 1 or 2 or 3 or 4 or 5 or 6 wherein said extension is located substantially midway between the ends of said center section.

8. The stylus holder set forth in claim 1 or 2 or 3 or 4 or 5 or 6 wherein said extension is located substantially at an antinodal point of the holder.

9. The stylus holder set forth in claim 2 wherein the annular mass is a mechanically lossy material.

10. The stylus holder set forth in claim 9 wherein the annular mass is a section of silicone rubber tubing.

11. The stylus holder set forth in claim 9 wherein the annular mass is between 1 and 6 milligrams in weight.

12. The stylus holder set forth in claim 9 or 10 or 11 wherein said extension is located substantially midway between the ends of said center section.

13. The stylus holder set forth in claim 9 or 10 or 11 wherein said extension is located substantially at an antinodal point of the holder.

* * * * *